May 21, 1968     W. WEBER     3,383,926
PLATFORM
Filed April 29, 1965
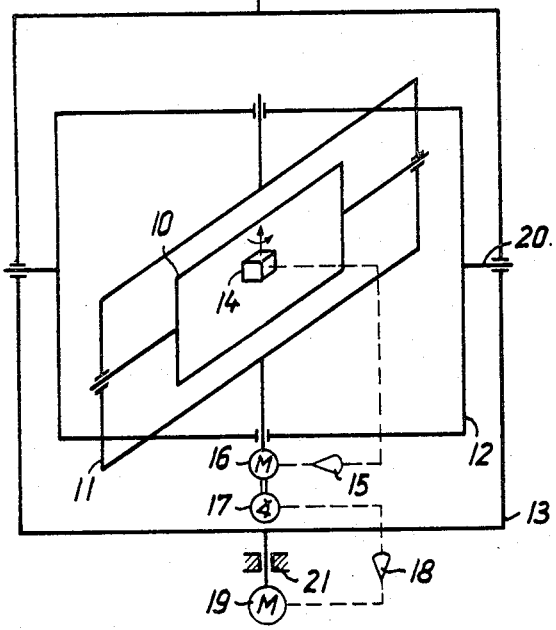
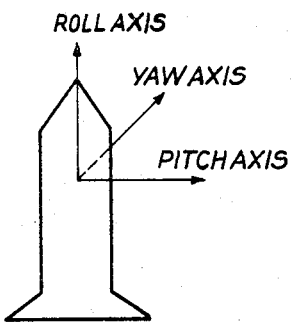
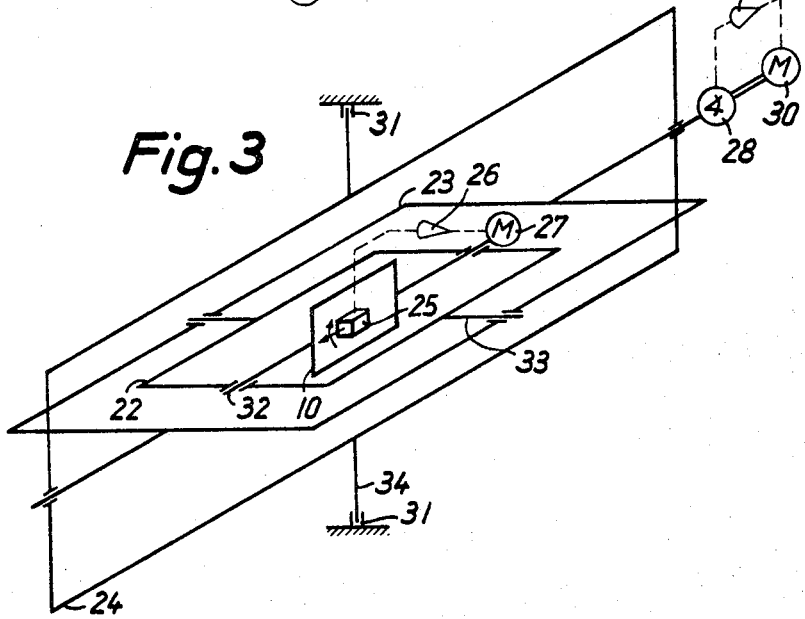
Inventor:
Wolfgang Weber
By: Spencer & Kaye
Attorneys 3,383,926
PLATFORM
Wolfgang Weber, Waldacker, Germany, assignor to Licentia Patent-Verwaltungs G.m.b.H., Frankfurt am Main, Germany
Filed Apr. 29, 1965, Ser. No. 451,856
Claims priority, application Germany, Apr. 16, 1964, L 47,604
3 Claims. (Cl. 74—5)

ABSTRACT OF THE DISCLOSURE

In a four-gimbal stable platform, including a pitch gimbal, a yaw gimbal, a roll vimbal, and an additional gimbal for preventing gimbal blockage, the additional gimbal is journalled between the pitch and roll gimbals and is maintained at right angles to the roll gimbal by means of a control circuit to prevent gimbal blockage.

Specification

The present invention relates generally to the guidance art, and, more particularly to a four-frame or gimbal platform which serves as a signal generator for indicating the position of a vehicle, especially a spacecraft, and which has to be stabilized about its yaw, pitch and roll axes.

In some cases a three-gimbal platform is not sufficient such as when there is a danger of gimbal blocking occurring, i.e., the platform losing one degree of freedom. This is the case when the vehicle moves in a range which is greater than a three-dimensional sector or solid angle of 90°. For this purpose a fourth gimbal is provided which is held in a predetermined position relative to one of the other gimbals by a separate control circuit.

The conventional arrangement of such a four-gimbal platform is shown schematically in FIGURE 1. A platform 10, which at the same time represents the yaw gimbal is positioned within an additional gimbal 11 which is generally called the "inner roll-gimbal," and which is positioned inside the pitch gimbal 12. This gimbal is positioned inside the roll gimbal 13. Of all the control circuits used, only the control circuit which stabilizes the platform about the roll-axis is shown. This control circuit has a sensing element 14, a dynamic correcting member 15, and a positioning motor 16 on the rotary axis of the additional gimbal 11. The position of the additional gimbal is defined in this case relative to the pitch gimbal 12, i.e., it is controlled together with the angle indicating member 17, the dynamic correcting member 18, and the positioning motor 19, in such a way that the additional gimbal 11 and the pitch gimbal 12 are always at right angles to each other. In order to clarify the position of the axes, FIGURE 2, is an example, showing the position of the axes in the launching position of a space rocket that takes off vertically.

This embodiment has a number of disadvantages. Slip-rings are required for the supply of the positioning motor 16, as well as for the transmission of the angle value from the generator 17 which measures these values to the position indicating generator 19. Therefore, the passage via the bearings 20 and 21 is necessary. The space requirements are consequently increased due to housing of the slip-rings. Furthermore the difficulties increase with the unbalance of the ring system, with the friction moment which occurs, and with the susceptibility of the slip-ring contacts to trouble. A second disadvantage of the described embodiment is that the stabilizing circuit around the roll axis disturbs the control circuit of the additional gimbal 11, in that every positioning signal which is generated by the first mentioned control circuit causes another control movement in the control circuit which includes the elements 17, 18 and 19, because this circuit has to restore the perpendicular position of the additional gimbal with respect to the roll gimbal. A third disadvantage is that the position indication generator 19 has to move the masses of the gimbals 12 and 13, which are the largest gimbals of the system.

With this in mind it is a main object of the present invention to provide a four-gimbal platform which eliminates the above-mentioned disadvantages or considerably decreases their effects.

Another object is to provide a device of the character described wherein slip-ring connections are not needed.

These objects and others ancillary thereto are accomplished in accordance with preferred embodiments of the invention wherein an additional gimbal is positioned between the pitch and roll gimbals and it is continuously held at right angles relative to the latter in a conventional manner by a separate control circuit. A separate control circut for the additional gimbal has a position indication generator and a generator that measures the angle values, which are positioned on the same rotary axis, so that slip-ring connections are not required.

Additional objects and advantages of the present invention will become apparent upon consideration of the following description when taken in conjunction with the accompanying drawings in which:

FIGURE 1 is a schematic view of a known four-gimbal platform.

FIGURE 2 is a schematic view of the relevant axes shown with respect to a missile in launching position.

FIGURE 3 is a schematic view of the four-gimbal platform of the present invention having the same axial position shown in FIGURE 2.

With more particular reference to the drawings, FIGURE 3 shows a platform 10 which also represents the yaw gimbal, and is positioned on the pitch gimbal 22. This gimbal 22 is positioned in the additional gimbal 23, which can also be called "outer yaw gimbal." The latter gimbal is positioned inside the roll gimbal 24. In FIGURE 3 there are also only two control circuits shown, one of which has a sensing element 25 on the platform 10, a dynamic correcting member 26 and a position indication generator 27, which stabilized the platform 10 about its own rotary axis. The other control circuit has a generator 28 for the measuring of the angle value, a dynamic correcting member 29 and a position indication generator 30 which controls the position of the additional gimbal in such manner that it is at right angles to the roll gimbal 24. The position of the roll gimbal 24 relative to the vehicle is here only indicated by the bearings 31.

In this embodiment the yaw angle is at the rotary axis 32 of the platform 10 and the pitch angle at the rotary axis 33 of the pitch gimbal 22. The roll angle results at the rotary axis 34 of the roll gimbal 24.

The invention is suitable for different kinds of vehicles, for example, for tanks, but especially also for space crafts.

It will be understood that the above description of the present invention is susceptible to various modifications, changes, and adaptations, and the same are intended to be comprehended within the meaning and range of equivalents of the appended claims.

What is claimed is:
1. In a four-gimbal stable platform including a yaw gimbal, a pitch gimbal, and a roll gimbal which are journalled respectively for rotation about three mutually perpendicular axes, and an additional gimbal which is journalled for rotation between two of said gimbals and which is maintained by a control circuit in a constant angular relationship with respect to one of said gimbals, the improvement wherein said additional gimbal is journalled between said roll and said pitch gimbals, and wherein said control circuit maintains said additional gimbal at right angles to said roll gimbal.

2. A four-gimbal stable platform as defined in claim 1 wherein said roll gimbal is journalled to a support member for rotation about the roll axis of said support member, said additional gimbal being journalled to said roll gimbal for rotation about the yaw axis of said support member, said pitch gimbal being journalled to said additional gimbal for rotation about the pitch axis of said support member, and said yaw gimbal being journalled to said pitch gimbal for rotation about the yaw axis of the support member.

3. In a four-gimbal platform, the combination which comprises:
   (a) a platform representing the yaw gimbal;
   (b) a pitch gimbal;
   (c) a roll gimbal, said gimbals being mounted to be mutually perpendicular to each other;
   (d) an additional gimbal for preventing gimbal blocking positioned between the pitch gimbal and the roll gimbal; and
   (e) a separate control circuit for continuously maintaining said additional gimbal at a right angle to said roll gimbal.

References Cited
UNITED STATES PATENTS

| | | | |
|---|---|---|---|
| 3,069,912 | 12/1962 | Faux et al. | 74—5.34 |
| 3,188,870 | 6/1965 | Lerman | 74—5.2 |
| 3,220,266 | 11/1965 | Jurman et al. | 74—5.34 |
| 3,258,977 | 7/1966 | Hoffman | 74—5.34 |

FRED C. MATTERN, JR., *Primary Examiner.*

J. D. PUFFER, C. J. HUSAR, *Assistant Examiners.*

UNITED STATES PATENT OFFICE
CERTIFICATE OF CORRECTION

Patent No. 3,383,926            May 21, 1968

Wolfgang Weber

It is certified that error appears in the above identified patent and that said Letters Patent are hereby corrected as shown below:

In the heading to the printed specification, line 7, cancel "Claims priority, application Germany, April 16, 1964, L 47,604".

Signed and sealed this 9th day of December 1969.

SEAL)

Attest:

Edward M. Fletcher, Jr.            WILLIAM E. SCHUYLER, JR.

Attesting Officer            Commissioner of Patents